(12) United States Patent
Okada et al.

(10) Patent No.: US 9,428,212 B2
(45) Date of Patent: Aug. 30, 2016

(54) STEERING DEVICE

(71) Applicant: NSK LTD., Tokyo (JP)

(72) Inventors: Shinji Okada, Gunma (JP); Yuuichi Tomaru, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/894,565

(22) PCT Filed: Nov. 17, 2014

(86) PCT No.: PCT/JP2014/080391
§ 371 (c)(1),
(2) Date: Nov. 30, 2015

(87) PCT Pub. No.: WO2015/125361
PCT Pub. Date: Aug. 27, 2015

(65) Prior Publication Data
US 2016/0101806 A1    Apr. 14, 2016

(30) Foreign Application Priority Data

Feb. 19, 2014   (JP) .................................. 2014-030018

(51) Int. Cl.
*B62D 1/184*    (2006.01)
*F16D 41/064*    (2006.01)

(52) U.S. Cl.
CPC ............. *B62D 1/184* (2013.01); *F16D 41/064* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,335,619 A * | 8/1967 | Curran | ................... | B62D 1/184 192/45.014 |
| 6,237,439 B1 * | 5/2001 | Weber | ..................... | B62D 1/16 280/777 |
| 6,543,592 B2 * | 4/2003 | Hori | ...................... | F16D 41/064 188/82.84 |
| 7,849,763 B2 * | 12/2010 | Lutz | ....................... | B62D 1/184 74/492 |
| 8,661,930 B2 * | 3/2014 | Okada | ................... | B62D 1/187 280/775 |
| 8,707,818 B2 * | 4/2014 | Okada | ................... | B62D 1/184 280/775 |
| 8,826,767 B2 * | 9/2014 | Maniwa | ................ | B62D 1/184 280/775 |
| 8,899,128 B2 * | 12/2014 | Maniwa | ................ | B62D 1/184 280/775 |
| 8,931,364 B2 * | 1/2015 | Hirooka | ................ | B62D 1/184 280/775 |

(Continued)

FOREIGN PATENT DOCUMENTS

DE    102012209283 A1 * 12/2012 ............ B62D 1/184
JP    08-240061 A     9/1996

(Continued)

OTHER PUBLICATIONS

International Preliminary Report on Patentability of PCT/JP2014/080391 dated Jun. 30, 2015.

(Continued)

*Primary Examiner* — Nicole Verley
(74) *Attorney, Agent, or Firm* — Sughrue Mion, PLLC

(57) ABSTRACT

A steering device includes a steering column, a bracket, and a fixing mechanism. The fixing mechanism includes a roller clutch, an inner ring, a slip ring and a rod which penetrates through side plate portions of the bracket. The roller clutch and the inner ring are not operated in a clamping direction in which the manipulation lever is rotated to provide a clamping force and are operated in a releasing direction in which the manipulation lever is rotated to release the clamping force. The slip ring is a friction providing member which applies frictional resistance to the rod in a case where the roller clutch and the inner ring are operated.

8 Claims, 13 Drawing Sheets

(56) References Cited

U.S. PATENT DOCUMENTS

| | | | |
|---|---|---|---|
| 9,079,612 B2* | 7/2015 | Wilkes | B62D 1/184 |
| 2014/0026707 A1* | 1/2014 | Yokota | B62D 1/184 74/493 |
| 2015/0053041 A1 | 2/2015 | Schnitzer et al. | |
| 2015/0166093 A1 | 6/2015 | Moriyama et al. | |
| 2015/0251682 A1* | 9/2015 | Kii | B62D 1/189 74/493 |
| 2015/0344062 A1* | 12/2015 | Johta | B62D 1/184 74/493 |
| 2015/0360712 A1* | 12/2015 | Baumeister | B62D 1/184 403/53 |
| 2015/0375769 A1* | 12/2015 | Abboud | B62D 1/181 74/493 |
| 2016/0016604 A1* | 1/2016 | Johta | B62D 1/184 74/493 |
| 2016/0039450 A1* | 2/2016 | Johta | B62D 1/184 74/493 |

FOREIGN PATENT DOCUMENTS

| | | | |
|---|---|---|---|
| JP | 09-272446 A | 10/1997 | |
| JP | 2001-173635 A | 6/2001 | |
| JP | 2003-269038 A | 9/2003 | |
| JP | 2004-339772 A | 12/2004 | |
| JP | WO 2007058158 A1 * | 5/2007 | B62D 1/184 |
| JP | 2008-156077 A | 7/2008 | |
| JP | 2011-007245 A | 1/2011 | |
| JP | 2013-241172 A | 12/2013 | |
| WO | 2013/107486 A1 | 7/2013 | |

OTHER PUBLICATIONS

International Search Report of PCT/JP2014/080391 dated Feb. 17, 2015.

* cited by examiner

STEERING DEVICE

CROSS REFERENCE TO RELATED APPLICATIONS

This is a National Stage of International Application No. PCT/JP2014/080391 filed Nov. 17, 2014, claiming priority based on Japanese Patent Application No. 2014-030018 filed Feb. 19, 2014, the contents of all of which are incorporated herein by reference in their entirety.

BACKGROUND OF THE INVENTION

1. Field of the Invention

The present invention relates to a steering device.

2. Description of the Related Art

A position adjusting mechanism which is provided in a steering device that provides a steering angle to a vehicle wheel according to the rotation of a steering wheel and adjusts the position of the steering wheel by rotating an manipulation lever according to the build and the like of an operator is widely known. For example, a steering device provided with the position adjusting mechanism is described in Patent Documents 1 and 2.

PRIOR ART

Prior Art 1: Japanese Laid-open Patent Publication No. 9-272446

Prior Art 2: WO 2013/107486 A

As a technique described in Prior Arts 1 and 2, a mechanism which attenuates swinging of the manipulation lever in the case of adjusting the position of the steering wheel is suggested. In the technique described in Prior Arts 1 and 2, in a case where the manipulation lever is changed from a locked state (position-fixed state) to an unlocked state (position-released state), it is difficult to suppress releasing noise generated when the manipulation lever is forcibly released.

The present invention has been made taking foregoing problems into consideration, and an object thereof is to provide a steering device capable of reducing the releasing noise generated by releasing the manipulation lever when the manipulation lever becomes unlocked (released state) from a locked state (position-fixed state).

SUMMARY OF THE INVENTION

According to an aspect of the invention, a steering device includes: a steering column rotatably supporting an input shaft connected to a steering wheel; a bracket pinching the steering column; and a fixing mechanism configured to select an unlocked state in which the bracket is releasing the steering column and a locked state in which the fixing mechanism is configured to provide a clamping force for allowing the bracket to pinch the steering column, according to a rotational position of an manipulation lever. The fixing mechanism includes a rod penetrating through the bracket, a roller clutch including an outer ring and an inner ring positioned on an inner diameter side of the outer ring, the roller clutch configured not to be operated in a clamping direction in which the manipulation lever is rotated to provide the clamping force, and to be operated in a releasing direction in which the manipulation lever is rotated to release the clamping force, a friction providing member to provide a frictional resistance to the rod in a case where the roller clutch is operated, and a cam mechanism which provides the clamping force according to a rotation of the manipulation lever. The cam mechanism includes a movable cam which is able to rotate according to the rotational position of the manipulation lever, and a fixed cam which is mounted to a side plate portion of the bracket and is unable to rotate relative to the rotation of the manipulation lever, the movable cam and the fixed cam are supported on the rod so that a distance between surfaces of the movable cam and the fixed cam is movable in an axial direction of the rod, a rotation of the movable cam is linked to the rotation of the manipulation lever, the roller clutch and the friction providing member are arranged in the movable cam or the fixed cam, the roller clutch and the friction providing member do not affect an operation of the manipulation lever, and the bracket is configured to clamp the steering column according to a change of the distance between the surfaces of the movable cam and the fixed cam according to the rotation of the manipulation lever, in a case where the fixing mechanism is operated from the unlock state to the locked state corresponding to the rotation of the manipulation lever in a clamping direction, and the friction providing member is configured to provide a frictional resistance to the rod by transmission of rotation between the outer ring and the inner ring of the roller clutch rotating linked to the movable cam, in a case where the fixing mechanism is operated from the lock state to the unlocked state corresponding to the rotation of the manipulation lever in a releasing direction.

In this structure, the roller clutch does not affect the operation of the manipulation lever in the clamping direction and can fix the position of the steering wheel. In addition, the roller clutch relieves an impact using the friction torque (frictional resistance) of the friction providing member after the manipulation lever is rotated in the releasing direction and the clamping force of the bracket on the steering column is released. As a result, even in a case where the manipulation lever is shifted from the locked state (position-fixed state) to the unlocked state (position-released state), the releasing noise generated in a case where the manipulation lever is forcibly released can be reduced.

Accordingly, compared to a fixing mechanism including a bolt and a nut, in the cam mechanism, the gradient of the clamping amount of the bracket clamping the steering column with respect to the rotation of the manipulation lever can be increased. Therefore, by increasing the tilt of the cam lobe of the cam mechanism, the gradient of the clamping amount increases such that the operator can obtain a sensation of clicking. Accordingly, in the steering device, operability for adjusting the position of the wheel is improved. With the steering device according to this aspect, by increasing the tilt of the cam lobe of the cam mechanism, reaction after the clamping force is released increases. However, the rotation of the rod is not transmitted to the manipulation lever by the roller clutch, and the friction providing member attenuates the rotation of the rod so as not to generate the releasing noise. Therefore, the tilt of the cam lobe of the cam mechanism can be further increased, and thus the operator can obtain a more clear clicking sensation. Accordingly, in the steering device, operability for adjusting the position of the wheel is improved.

According to further aspect of the invention, the roller clutch is cylindrical and has the friction providing member on an inner diameter side thereof. Accordingly, the fixing mechanism has a small size and a possibility that the fixing mechanism may interfere with the members in the periphery of the steering device is reduced, thereby increasing the degree of freedom of the fixing mechanism disposed in a space in the vehicle.

According to further aspect of the invention, the roller clutch is cylindrical and has the friction providing member on an outer diameter side thereof. Accordingly, the degree of freedom of the fixing mechanism such as arrangement of the rod can be increased.

According to further aspect of the invention, the roller clutch includes an outer ring, an inner ring which is positioned on an inner diameter side of the outer ring, and a wedge roller which is operated as a wedge between the outer ring and the inner ring in the releasing direction and allows the wedge between the outer ring and the inner ring to separate in the clamping direction. In this structure, the roller clutch is not operated in the clamping direction, and the rotation of the manipulation lever is not transmitted to the rod. In addition, the roller clutch is operated in the releasing direction and relieves an impact using the friction torque between the roller clutch and the friction providing member.

According to further aspect of the invention, the outer ring is configured to link to the rotation of the manipulation lever, and the rod penetrates through the inner ring, the rod is arranged to be unable to rotate relative to the rotation of the manipulation lever. In this structure, when the manipulation lever is rotated in the clamping direction, the roller clutch is not operated to transmit the rotation between the outer ring and the inner ring. In addition, when the manipulation lever is rotated in the releasing direction, the roller clutch is operated to transmit the rotation between the outer ring and the inner ring, and the impact can be relieved by the friction torque between the roller clutch and the friction providing member.

According to still further aspect of the invention, the outer ring is press-fitted and fixed to the fixed cam, and the rod penetrates through the inner ring and is configured to link to the rotation of the manipulation lever. In this structure, when the manipulation lever is rotated in the clamping direction, the roller clutch is not operated to transmit the rotation between the outer ring and the inner ring. In addition, when the manipulation lever is rotated in the releasing direction, the roller clutch is operated to transmit the rotation between the outer ring and the inner ring, and the impact can be relieved by the friction torque between the roller clutch and the friction providing member.

According to still further aspect of the invention, the friction providing member is a slip ring which generates friction against an outside surface of a plate spring or an inside surface of the plate spring through an elastic force by bending the plate spring. In this structure, friction torque can be applied to the rod with a simple structure.

According to still further aspect of the invention, the friction providing member is a resin inner ring which has elasticity in a case where a surface thereof is pressed, and is fixed to an outer circumference of the rod. In this structure, an inexpensive material can be used, and the number of components can be reduced.

According to the present invention, a steering device capable of reducing the releasing noise generated by releasing an manipulation lever when the manipulation lever becomes unlocked (released state) from a locked state (position-fixed state) can be provided.

DETAILED DESCRIPTION OF THE PREFERRED EMBODIMENT

Embodiments for embodying the present invention will be described in detail with reference to the drawings. The present invention is not limited by the contents described in the following embodiments. In addition, constituent elements described below include elements that are easily postulated by a person skilled in the art and substantially equivalent elements. Furthermore, the constituent elements described below may be appropriately combined.

First Embodiment

Figure 1:
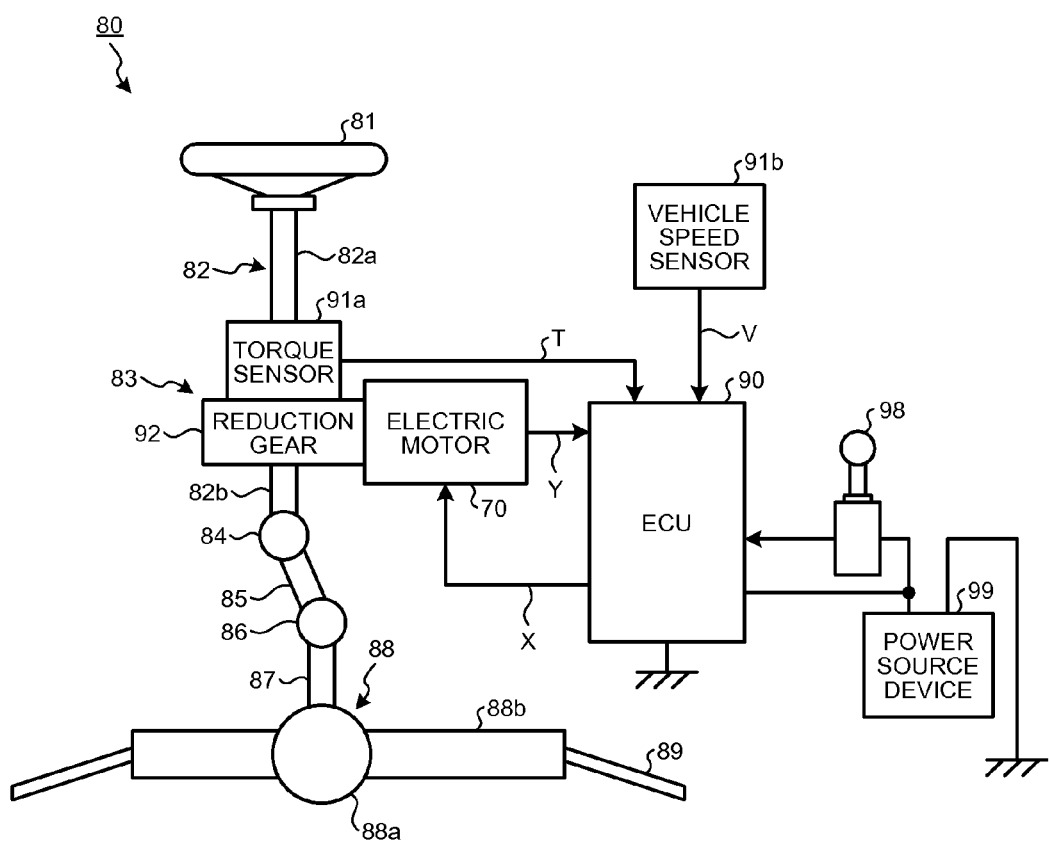
FIG. 1 is a diagram of the constitution of a steering device according to a first embodiment.
Figure 2:
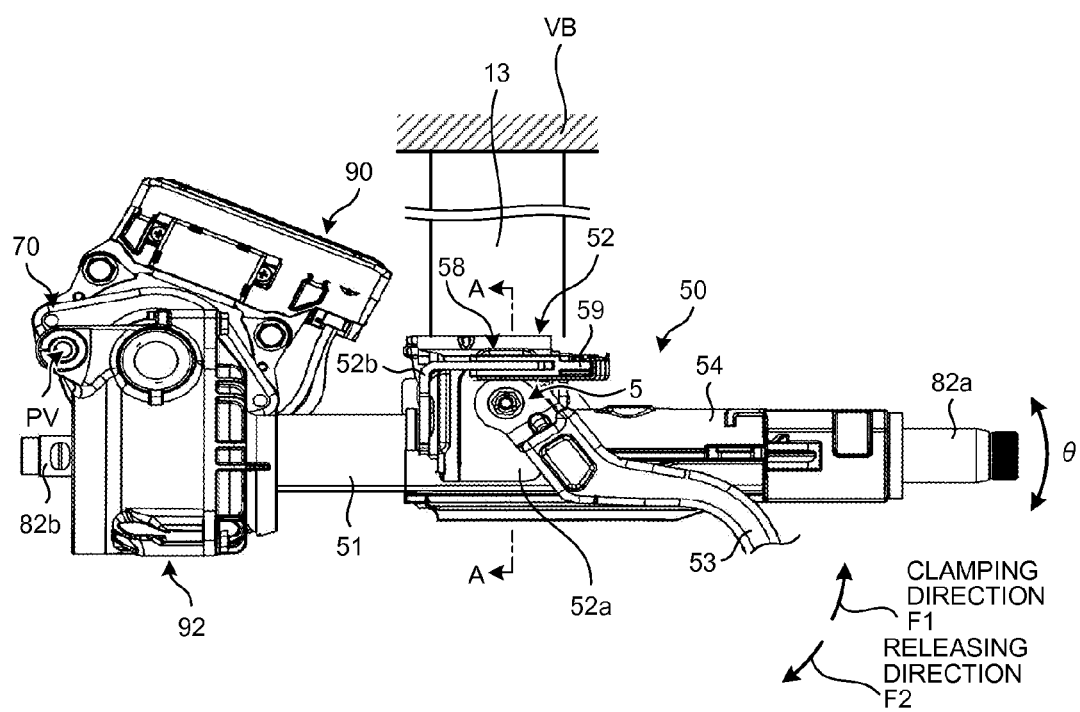
FIG. 2 is a side view schematically illustrating the periphery of a steering column according to the first embodiment.

FIG. 1 is a diagram of the constitution of a steering device according to a first embodiment. FIG. 2 is a side view schematically illustrating the periphery of a steering column. An outline of a steering device 80 according to the first embodiment will be described using FIGS. 1 and 2. In addition, in the following description, the front side of a vehicle in a case where the steering device 80 is mounted in the vehicle is simply referred to as a front side, and the rear side of the vehicle in a case where the steering device 80 is mounted in the vehicle is simply referred to as a rear side. In FIG. 2, the front side is the left side in the figure, and the rear side is the right side in the figure.

The steering device 80 includes, in order in which a force from an operator is transmitted, a steering wheel 81, a steering shaft 82, a steering force assistance mechanism 83, a universal joint 84, a lower shaft 85, a universal joint 86, a pinion shaft 87, a steering gear 88, and a tie rod 89. In addition, the steering device 80 includes an ECU (Electronic Control Unit) 90 and a torque sensor 91a. A vehicle speed sensor 91b is provided in the vehicle and inputs a vehicle speed signal V to the ECU 90 through CAN (Controller Area Network) communication.

The steering shaft 82 includes an input shaft 82a and an output shaft 82b. One end of the input shaft 82a is connected to the steering wheel 81, and the other end thereof is connected to the steering force assistance mechanism 83 via the torque sensor 91*a*. One end of the output shaft 82*b* is connected to the steering force assistance mechanism 83, and the other end thereof is connected to the universal joint 84.

One end of the lower shaft 85 is connected to the universal joint 84, and the other end thereof is connected to the universal joint 86. One end of the pinion shaft 87 is connected to the universal joint 86, and the other end thereof is connected to the steering gear 88.

The steering gear 88 includes a pinion 88*a* and a rack 88*b*. The pinion 88*a* is connected to the pinion shaft 87. The rack 88*b* meshes with the pinion 88*a*. The steering gear 88 is composed of a rack and pinion type. The steering gear 88 converts rotational motion transmitted to the pinion 88*a* into linear motion through the rack 88*b*. The tie rod 89 is connected to the rack 88*b*.

The steering force assistance mechanism 83 includes a reduction gear 92 and an electric motor (motor) 70. In addition, the electric motor 70 is exemplified by a so-called brushless motor, and may also be an electric motor including a brush and a commutator. The reduction gear 92 is connected to the output shaft 82*b*. The electric motor 70 is connected to the reduction gear 92 and is a motor which generates an assistive steering torque. In addition, in the steering device 80, a steering column is constituted by the steering shaft 82, the torque sensor 91*a*, and the reduction gear 92. The electric motor 70 applies the assistive steering torque to the output shaft 82*b* of the steering column. That is, the steering device 80 of the first embodiment is in a column assistance type.

The torque sensor 91*a* illustrated in FIG. 1 detects a steering force of a driver, transmitted to the input shaft 82*a* via the steering wheel 81, as a steering torque. The vehicle speed sensor 91*b* detects the travelling speed (vehicle speed) of the vehicle in which the steering device 80 is mounted. The ECU 90 is electrically connected to the electric motor 70, the torque sensor 91*a*, and the vehicle speed sensor 91*b*.

The ECU 90 controls the operations of the electric motor 70. In addition, the ECU 90 acquires a signal from each of the torque sensor 91*a* and the vehicle speed sensor 91*b*. That is, the ECU 90 acquires the steering torque T from the torque sensor 91*a* and acquires the vehicle speed signal V of the vehicle from the vehicle speed sensor 91*b*. The ECU 90 is supplied with power from a power source device (for example, an in-vehicle battery) 99 in a state where an ignition switch 98 is turned on. The ECU 90 calculates an assistive steering command value for an assistance command on the basis of the steering torque T and the vehicle speed signal V. In addition, the ECU 90 controls a power value X to be supplied to the electric motor 70 on the basis of the calculated assistive steering command value. The ECU 90 acquires, as operation information Y, information of an induced voltage from the electric motor 70 or information of the rotation of a rotor such as a resolver, which will be described later.

The steering force of an operator (driver) input to the steering wheel 81 is transmitted to the reduction gear 92 of the steering force assistance mechanism 83 via the input shaft 82*a*. At this time, the ECU 90 acquires the steering torque T input to the input shaft 82*a* from the torque sensor 91*a* and acquires the vehicle speed signal V from the vehicle speed sensor 91*b*. In addition, the ECU 90 controls the operations of the electric motor 70. The assistive steering torque produced by the electric motor 70 is transmitted to the reduction gear 92.

The steering torque (including the assistive steering torque) output via the output shaft 82*b* is transmitted to the lower shaft 85 via the universal joint 84, and is further transmitted to the pinion shaft 87 via the universal joint 86. The steering force transmitted to the pinion shaft 87 is transmitted to the tie rod 89 via the steering gear 88 and turns steered wheels.

As illustrated in FIG. 2, the steering device 80 includes a steering column 50 which rotatably supports the input shaft 82*a* connected to the steering wheel 81. The steering column 50 includes a cylindrical outer column 54, and a cylindrical inner column 51 of which a portion is inserted into the outer column 54. For example, the outer column 54 is disposed on the rear side of the inner column 51. Otherwise, the outer column 54 may be disposed on the front side of the inner column 51.

As illustrated in FIG. 2, a mounting plate portion 52*b* of a bracket 52 includes a pair of left and right detachment capsules 58 mounted to a vehicle side member 13 fixed to a vehicle VB, and capsule support portions 59 fixed to the detachment capsules 58 by a shear pin of a resin member formed by resin injection molding. The detachment capsule 58 is formed by aluminum die casting. The detachment capsule 58 has a capsule mounting hole and is fixed to the vehicle side member by a bolt or the like inserted into the capsule mounting hole. By applying a force to move the steering column 50 forward during a collision, the capsule support portion 59 slides toward the front side of the vehicle with respect to the detachment capsule 58 and the shear pin of the resin member shears off. Accordingly, support for the steering column 50 by the detachment capsule 58 is released, and the steering column 50 can be separated from the vehicle.

The steering device 80 includes the bracket 52 which is fixed to the vehicle side member and supports the steering column 50. The bracket 52 includes the mounting plate portion 52*b* fixed to the vehicle side member, and side plate portions 52*a* which are formed integrally with the mounting plate portion 52*b*. The side plate portions 52*a* of the bracket 52 are disposed to face each other on both sides of the outer column 54 and clamp the outer column 54. A rod 5 penetrates through elongated holes provided in the side plate portions 52*a* and is connected to an manipulation lever 53 via a fixing mechanism, which will be described later. The elongated holes provided in the side plate portions 52*a* are elongated holes which are elongated in a vertical direction of the vehicle on a plane perpendicular to the axial direction of the rod 5. In the elongated holes provided in the side plate portions 52*a*, a rotation stopper portion 3F provided in a fixed cam 3 and a rotation stopper portion 5C provided in the rod 5 are fitted, and the rotation stopper portion 5C makes the rod 5 relatively non-rotatable such that the rod 5 is not linked to the rotation of the manipulation lever 53. The rotation stopper portion 3F will be described later.

The outer diameter of the inner column 51 is substantially the same as the inner diameter of the outer column 54. The inner diameter of the outer column 54 decreases in the case where the outer column 54 is clamped. Accordingly, in a state where the outer column 54 is clamped, the inner circumferential surface of the outer column 54 and the outer circumferential surface of the inner column 51 come into contact with each other in a section in which the outer column 54 covers the inner column 51. Therefore, frictional force occurs between the outer column 54 and the inner column 51 in the state where the outer column 54 is clamped. In addition, the outer column 54 may include a telescopic mechanism having an elongated hole and may be slidable with respect to the inner column 51 in a predetermined range.

When the operator rotates the manipulation lever 53 in a releasing direction F2, the clamping force by the side plate portions 52a is relieved, and the frictional force between the side plate portions 52a and the outer circumferential surface of the outer column 54 is removed or reduced. The reduction gear 92 is swingably supported by a tilt pivot PV provided closer to the front side of the vehicle than the steering column 50. Accordingly, a tilt position can be adjusted according to the rotational position of the manipulation lever 53 in a range of a tilt angle θ between an upper tilt stage and a lower tilt stage. In addition, when the manipulation lever 53 is rotated and enters an unlocked state (position-released state), the clamping force by the side plate portions 52a decreases, and the frictional force is removed in a case where the outer column 54 slides. Accordingly, the operator can adjust a telescopic position by pulling and pushing the steering column 50 using the steering wheel 81 after rotating the manipulation lever 53. As described above, the bracket 52 tiltably holds the steering column 50. In a state where the clamping force by the side plate portions 52a is relieved by the manipulation lever 53, there is a possibility that the steering column 50 may be lowered. Therefore, the steering device 80 may also include a tilt spring (not illustrated).

Figure 3:
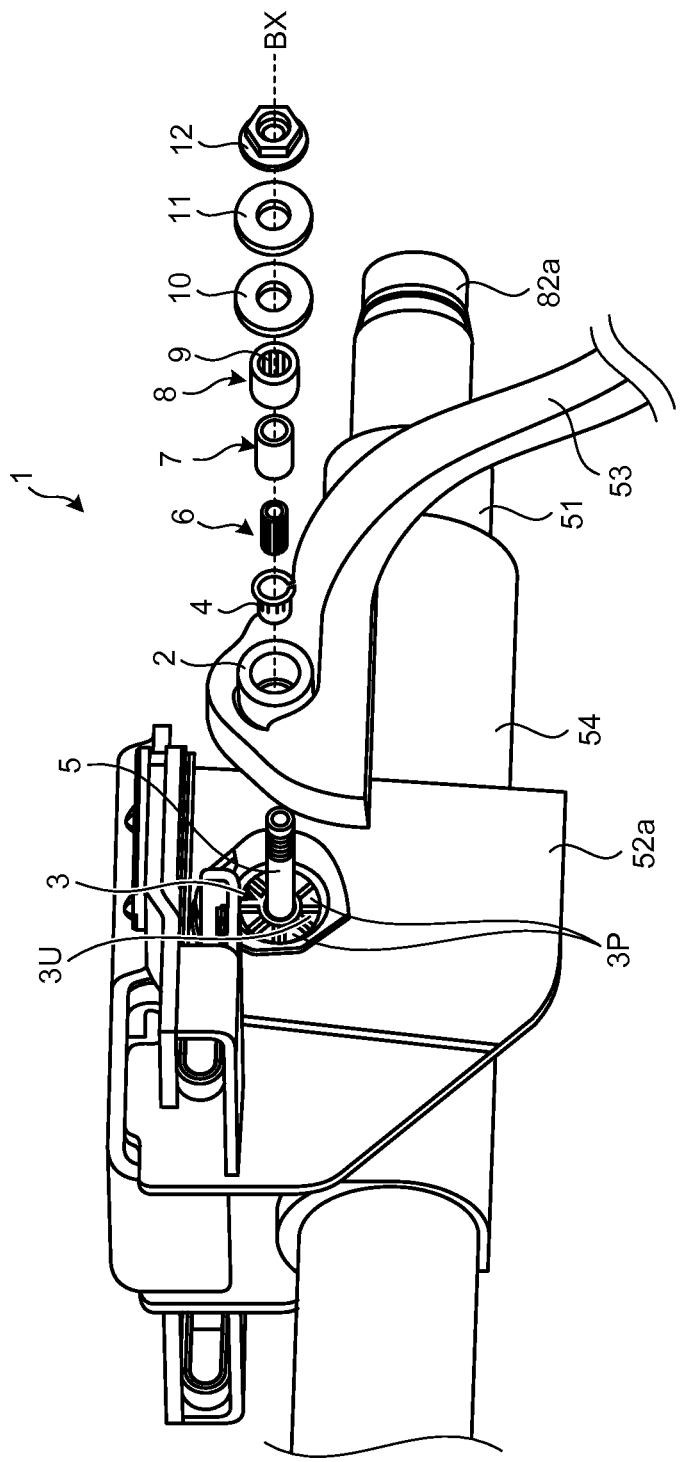
FIG. 3 is an exploded perspective view schematically illustrating a fixing mechanism according to the first embodiment.
Figure 4:
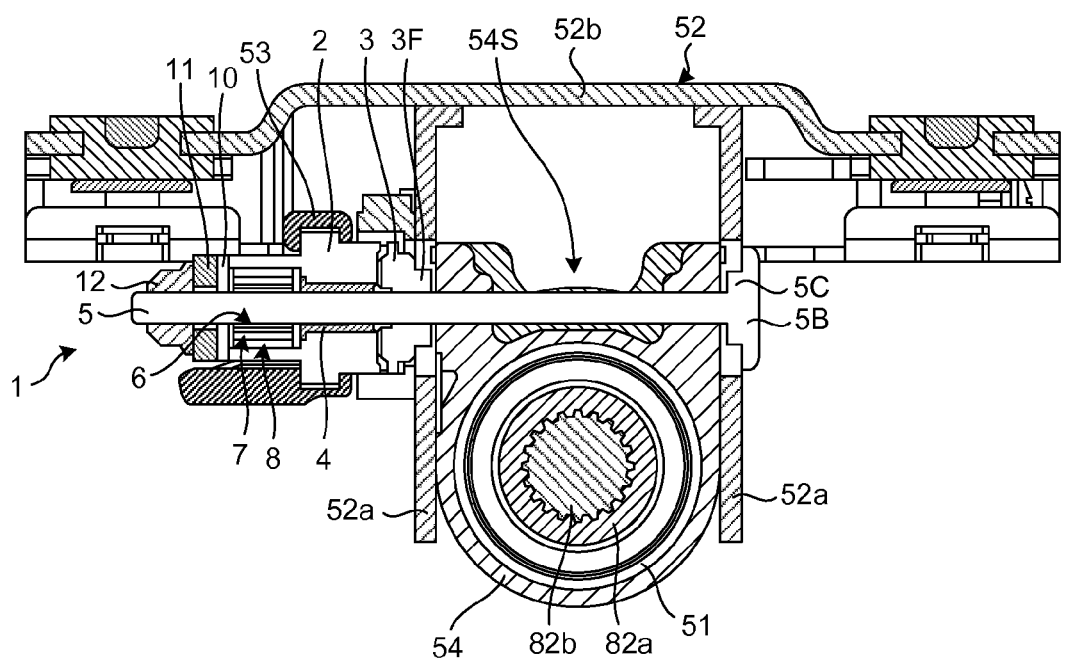
FIG. 4 is a sectional view schematically illustrating the fixing mechanism according to the first embodiment.

As described above, in the steering device 80, the position of the steering wheel 81 can be adjusted by rotating the manipulation lever 53 according to the build and the like of the operator. After the adjustment, the manipulation lever 53 is rotated in a clamping direction F1 and enters a locked state (position-fixed state) to fix the position of the steering wheel 81. Therefore, as illustrated in FIGS. 3 and 4, the steering device 80 includes a fixing mechanism 1 which selects the locked state (position-fixed state) or the unlocked state (position-released state) by rotation of the manipulation lever 53, and maintains the locked state (position-fixed state) in a case where the manipulation lever 53 is in the locked state. FIG. 3 is an exploded perspective view schematically illustrating the fixing mechanism according to the first embodiment. FIG. 4 is a sectional view schematically illustrating the fixing mechanism according to the first embodiment. In addition, FIG. 4 is a sectional view taken along A-A section of FIG. 2.

As illustrated in FIGS. 3 and 4, the fixing mechanism 1 includes the rod 5, a roller clutch 8, an inner ring 7, a slip ring 6, a washer 10, a thrust bearing 11, a nut 12, and a cam mechanism having a movable cam 2 and the fixed cam 3.

The cam mechanism includes the movable cam 2 which is mounted to the manipulation lever 53 and rotates integrally with the manipulation lever 53, and the fixed cam 3. The position of the fixed cam 3 is determined by the rotation stopper portion 3F, and the rotation stopper portion 3F enables the fixed cam 3 to slide in the side plate portion 52a of the bracket 52 in a tilt direction and makes the fixed cam 3 relatively non-rotatable to prevent the fixed cam 3 from linking to the rotation of the manipulation lever 53. As illustrated in FIG. 3, the fixed cam 3 has a cam surface in which concave portions 3U are arranged between the cam lobes of convex portions 3P around an axial direction BX as a surface facing the movable cam 2, and the movable cam 2 also has a cam surface having similar concave and convex portions fitted into the convex portions 3P and the concave portions 3U of the fixed cam 3 as a surface facing the fixed cam 3. As described above, the movable cam 2 and the fixed cam 3 have the concave and convex portions formed in the circumferential direction, and in the case where the cams are rotated relative to each other, the distance between the movable cam 2 and the fixed cam 3 is changed in the axial direction BX in which the rod 5 extends, according to the rotational position of the movable cam 2. That is, the cam lobe of the movable cam 2 and the cam lobe of the fixed cam 3 superpose on each other when viewed in the axial direction BX, and the distance between the movable cam 2 and the fixed cam 3 increases. In a case where the cam lobe of the movable cam 2 and the cam lobe of the fixed cam 3 mesh alternatively with each other in the circumferential direction to be fitted to each other when viewed in the axial direction BX, the distance between the movable cam 2 and the fixed cam 3 decreases.

The rod 5 is allowed to slide in the tilt direction by the rotation stopper portion 5C with respect to the side plate portions 52a of the bracket 52, and includes a rod head portion 5B provided at one end of the rod body to be made relatively non-rotatable to prevent the rod head from linking the rotation of the manipulation lever 53. A male screw to be fastened to the nut 12 is cut at the other end of the rod body of the rod 5 on the opposite side of the rod head portion 5B. The rod 5 penetrates through the manipulation lever 53, the thrust bearing 11, the washer 10, the roller clutch 8, the inner ring 7, the slip ring 6, a spacer 4, the movable cam 2, the fixed cam 3, and the bracket 52, which are sandwiched between the rod head portion 5B and the nut 12. The rod 5, the nut 12, the washer 10, and the spacer 4 are made of hardened steel and use a hard material. The nut 12 is fastened to the rod 5 to press the movable cam 2 against the manipulation lever 53 via the thrust bearing 11 and the washer 10 so as to link the rotation of the manipulation lever 53 to the rotation of the movable cam 2. Since the distance between the movable cam 2 and the fixed cam 3 is changed according to the rotational position of the movable cam 2, the thrust bearing 11 is supported by the rod 5 to be movable in the axial direction BX.

The spacer 4 fills the gap between the movable cam 2 and the rod 5 on the inside of the movable cam 2 (on the rod 5 side) and can rotate relative to the movable cam 2 although it is fixed to the rod 5.

The roller clutch 8 is press-fitted to the inner diameter wall surface of the movable cam 2. The inner ring 7 as the inner ring of a clutch mechanism is fitted to the inside (the rod 5 side) of the roller clutch. The roller clutch 8 and the inner ring 7 may be collectively called a roller clutch.

The slip ring 6 is fitted to the inner diameter wall surface of the inner ring 7. As described above, the roller clutch 8 has a cylindrical shape, and the slip ring 6 is positioned on the inner diameter side of the roller clutch 8. The slip ring 6 generates friction between the outside surface of a plate spring and the inside surface of the plate spring through an elastic force by bending the plate spring to cover the circumference of the rod 5. The friction of the slip ring 6 can be adjusted by the thickness, material, size in the axial direction BX, and the like of the plate spring. Accordingly, the fixing mechanism 1 has a small size and a possibility that the fixing mechanism 1 may interfere with the members in the periphery of the steering device 80 is reduced, thereby increasing the degree of freedom of arrangement of the fixing mechanism in a space in the vehicle.

Figure 5:
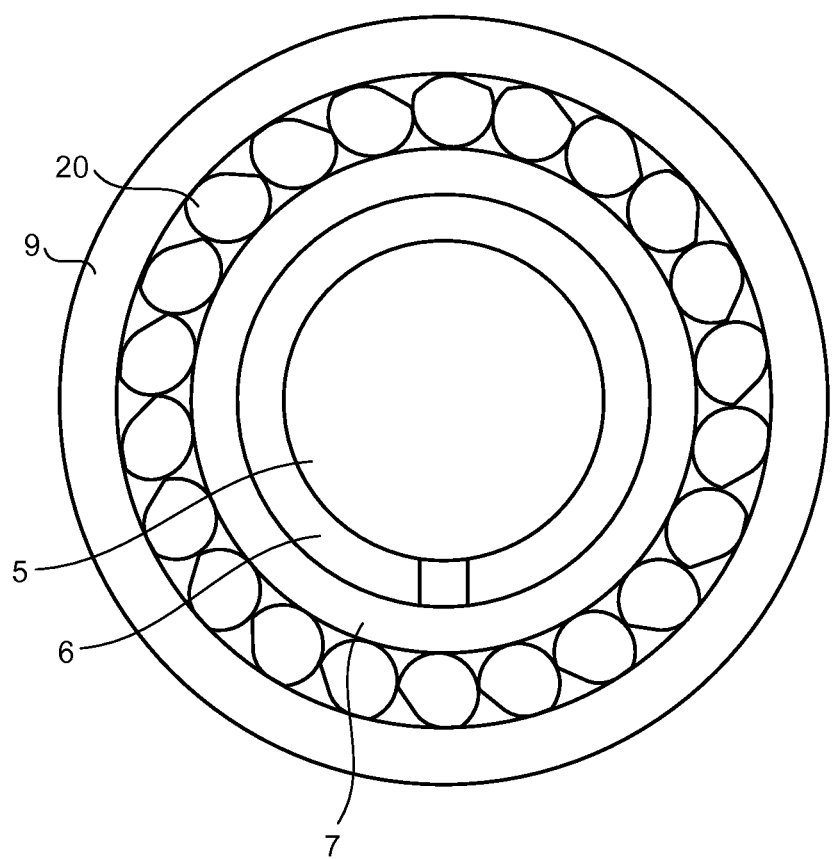
FIG. 5 is a schematic view of a virtual section of a roller clutch according to the first embodiment, taken along a plane perpendicular to the axial direction of the rod.
Figure 6:
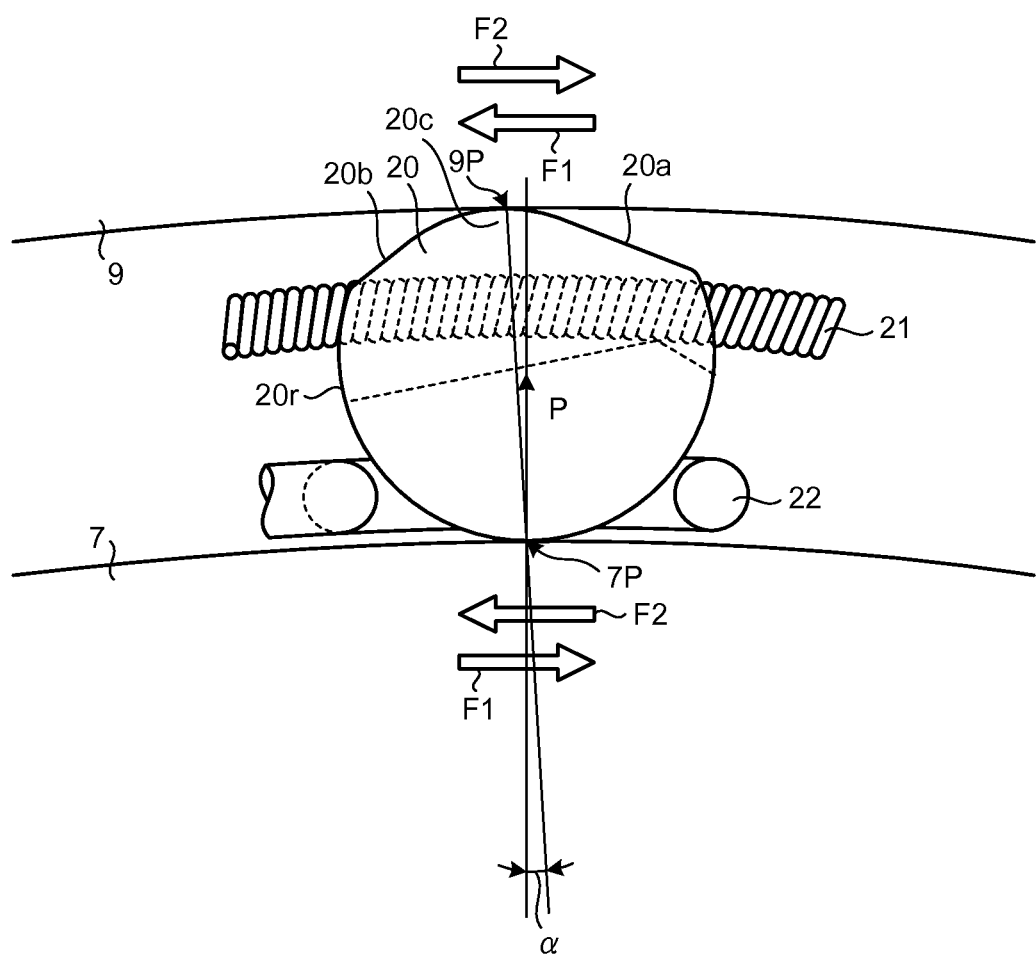
FIG. 6 is an explanatory view illustrating a wedge roller of the roller clutch according to the first embodiment.
Figure 7:
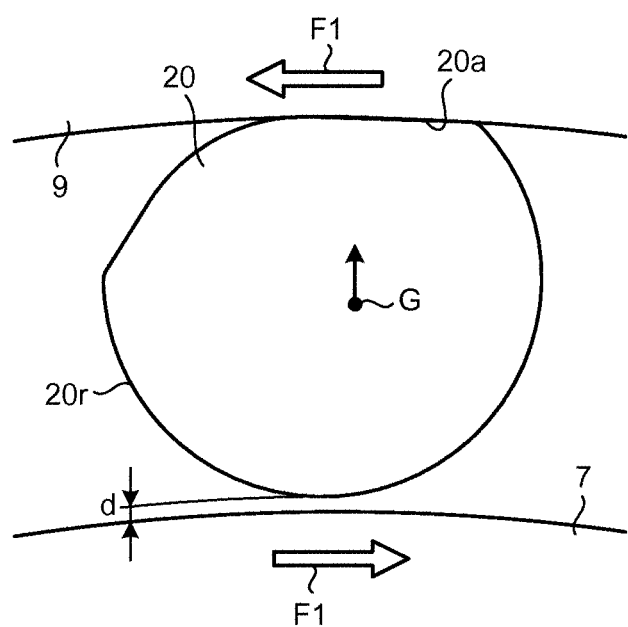
FIG. 7 is an explanatory view illustrating a state where the roller clutch according to the first embodiment receives an operating force in a clamping direction.
Figure 8:
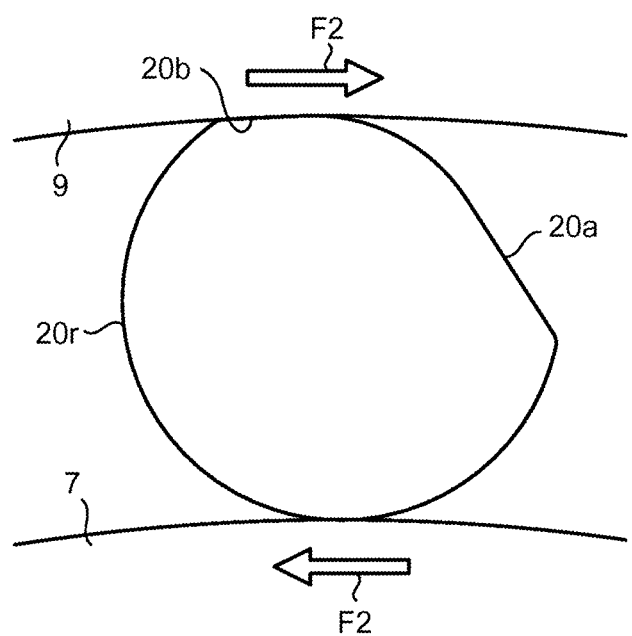
FIG. 8 is an explanatory view illustrating a state where the roller clutch according to the first embodiment receives an operating force in a releasing direction.

FIG. 5 is a schematic view of a virtual section of the roller clutch according to the first embodiment, taken along the plane perpendicular to the axial direction of the rod. FIG. 6 is an explanatory view illustrating a wedge roller of the roller clutch according to the first embodiment. FIG. 7 is an explanatory view illustrating a state where the roller clutch according to the first embodiment receives an operating force in the clamping direction. FIG. 8 is an explanatory view illustrating a state where the roller clutch according to the first embodiment receives an operating force in the releasing direction. As illustrated in FIG. 5, the roller clutch 8 includes an outer ring 9 and wedge rollers 20. In the roller clutch 8, the outer circumference of the outer ring 9 is fixed to the movable cam 2, and the inner ring 7 is fitted to the inner periphery of the outer ring 9 via the wedge rollers 20. A plurality of the wedge rollers 20 are evenly disposed in the circumferential direction between the outer ring 9 and the inner ring 7 which serves as the inner ring, transmit torque during rotation in only one direction of the outer ring 9 or the inner ring 7 (inner ring), and do not transmit torque in another direction and allow the outer ring 9 or the inner ring 7 (inner ring) to idle. As illustrated in FIG. 6, the wedge roller 20 includes a spherical portion 20r which has the shape of a portion of a spherical shape that becomes an arc in a sectional view, cam surfaces 20a and 20b formed by cutting the spherical shape by a predetermined plane or a curve, and an abutting portion 20c positioned at the boundary between the cam surface 20a and the cam surface 20b. In order to urge the wedge rollers 20, the roller clutch 8 includes a garter spring 21 and a wire gauge 22 for determining the position of the wedge rollers 20. The garter spring 21 is a urging member which urges the wedge rollers 20 in a direction in which the wedge rollers 20 always come into contact with the outer ring 9 and the inner ring 7 (inner ring), and another mechanical element such as a plate spring may also be employed as long as the same function is provided. The wire gauge 22 can assemble the members of the roller clutch 8, and another mechanical element may also be employed as long as the same function is provided.

As illustrated in FIG. 7, when the outer ring 9 is rotated along the rotation of the movable cam 2 in an F1 direction, the cam surface 20a comes into contact with the outer ring 9, the wedge roller 20 which is rotated about the center of gravity G is separated from the surface of the inner ring 7 by a gap d at the spherical portion 20r, and the rotation of the outer ring 9 of the roller clutch 8 is not applied to the inner ring 7.

As illustrated in FIG. 6, the abutting portion 20c of the wedge roller 20 as the starting point comes into contact with a point of contact 9P between the wedge roller 20 and the outer ring 9, and the spherical portion 20r starts to be operated as a wedge (or a prop) at a point of contact 7P between the wedge roller 20 and the inner ring 7 (inner ring). As illustrated in FIG. 6, the angle between a P direction drawn from the center (the axial direction BX described above) of the outer ring 9 or the inner ring 7 (inner ring) toward the outer circumference and the line of action that connects the point of contact 9P and the point of contact 7P is referred to as α, and when the angle α increases, a force is applied to the releasing direction F2 and the cam surface 20b touches the inner circumference of the outer ring 9. Accordingly, while the wedge roller 20 is prevented from being overturned, the wedge roller 20 is operated as the wedge between the outer ring 9 and the inner ring 7 (inner ring) in the releasing direction F2, and locks the motion of the inner ring 7. At this time, the slip ring 6 attenuates an impact through friction generated during rotation between the slip ring 6 and the inner ring 7 and can relieve the impact. In addition, even in a case where the inner ring 7 (inner ring) is rotated in the clamping direction F1, similarly, torque transmission between the outer ring 9 and the inner ring 7 (inner ring) is possible. As described above, the slip ring 6 according to the first embodiment is provided between the rod 5 and the inner ring 7, and in a case where the roller clutch 8 is operated to lock the inner ring 7, the slip ring 6 can relieve an impact caused when the manipulation lever 53 is forcibly released. Accordingly, the steering device 80 according to the first embodiment can reduce the releasing noise.

As described above, the outer ring 9 of the roller clutch 8 according to the first embodiment is linked to the rotation of the movable cam 2. That is, the outer ring 9 is rotated along the rotation of the manipulation lever 53. In this structure, when the manipulation lever 53 is rotated in the clamping direction F1, the roller clutch 8 is not operated to transmit the rotation between the outer ring 9 and the inner ring 7 which is the inner ring. In addition, when the manipulation lever 53 is rotated in the releasing direction, the roller clutch 8 is operated to transmit the rotation between the outer ring 9 and the inner ring 7 which is the inner ring, and the force of the manipulation lever 53 is suppressed by friction torque between the roller clutch 8 and the slip ring 6, such that the impact can be relieved.

Figure 9:
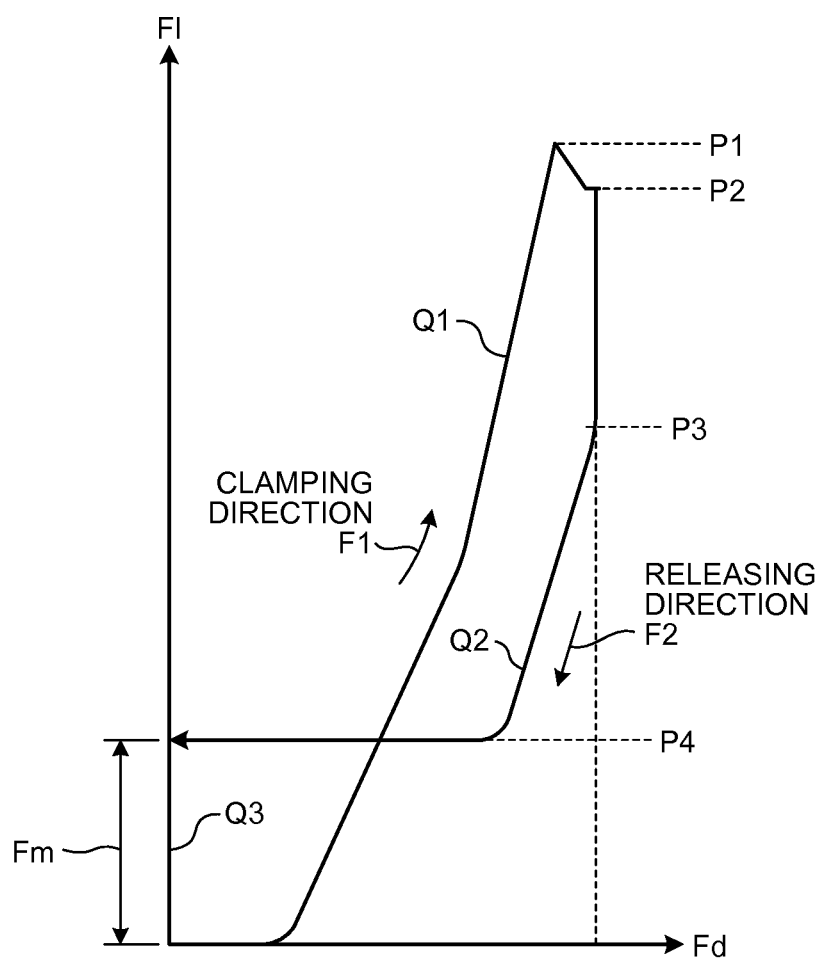
FIG. 9 is an explanatory view illustrating a force transmitted to an manipulation lever according to the first embodiment.

FIG. 9 is an explanatory view illustrating a force transmitted to the manipulation lever according to the first embodiment. In FIG. 9, the vertical axis is an manipulation lever operating force Fl (hereinafter, referred to as an operating force Fl) transmitted to the manipulation lever 53, and the horizontal axis is a clamping force Fd transmitted to the bracket. In addition, in a case where the manipulation lever 53 is rotated and enters the unlocked state (position-released state), the operating force Fl has an initial value (for example, 0). In the unlocked state (position-released state), the distance between the movable cam 2 and the fixed cam 3 decreases. In addition, the fixing mechanism 1, a pinching pressure of the side plate portions 52a of the bracket 52 on the steering column 50 is removed. Therefore, the clamping force Fd applied between the side plate portions 52a of the bracket 52 can be relieved according to the rotation of the manipulation lever 53, and the frictional force between the side plate portions 52a of the bracket 52 and the outer column 54 is in a state of being removed or reduced.

In FIG. 9, the case of a transition from the unlocked state (position-released state) to the locked state (position-fixed state) will be described. The clamping force Fd increases with the tilt of the cam lobe of the movable cam 2 and the cam lobe of the fixed cam 3 by the rotation of the manipulation lever 53 as indicated by curve Q1.

In a case where the manipulation lever 53 is rotated in the clamping direction F1 in which the clamping force Fd is applied, the rotation thereof is transmitted to the rotation of the movable cam 2, and the distance between the movable cam 2 and the fixed cam 3 increases. In this case, the rotation of the manipulation lever 53 allows the movable cam 2 to rotate in the F1 direction illustrated in FIG. 6. In the roller clutch 8, when the outer ring 9 is rotated along the rotation of the movable cam 2 in the F1 direction, the wedge rollers 20 are separated from the surface of the inner ring 7, and the rotation of the outer ring 9 of the roller clutch 8 is not applied to the inner ring 7. Therefore, the roller clutch 8 and the inner ring 7 do not affect the operating force Fl changing from the unlocked state (position-released state) to the locked state (position-fixed state).

Next, as illustrated in FIG. 9, when the cam lobe of the movable cam 2 and the cam lobe of the fixed cam 3 run on each other, the operating force Fl of the manipulation lever 53 reaches the position of P1 illustrated in FIG. 9. Furthermore, when the manipulation lever 53 is rotated, the thrust bearing 11 is operated at the position of P1 illustrated in FIG. 9, and the thrust bearing 11 reduces frictional force. Accordingly, the operating force Fl of the manipulation lever 53 generates a sensation of clicking at the operating force Fl at the position P2 and fixed. As described above, compared to a fixing mechanism including a bolt and a nut according to the related art, in the cam mechanism, the gradient of the clamping amount (clamping force Fd) of the bracket 52 clamping the steering column 50 with respect to the rotation (operating force Fl) of the manipulation lever 53 can be increased. Therefore, by increasing the tilt of the cam lobe of the cam mechanism, the gradient of the clamping amount increases such that the operator can obtain a sensation of clicking. Accordingly, in the steering device according to the first embodiment, operability for adjusting the position of the wheel is improved.

In the locked state (position-fixed state), the clamping force Fd applied between the side plate portions 52*a* of the bracket 52 is high, and thus the tilt position of the steering column 50 can be fixed. In addition, by rotating the manipulation lever 53, the pinching pressure of the bracket 52 increases to increase frictional force generated between the inner column 51 and the outer column 54. Accordingly, the telescopic position can be fixed.

In FIG. 9, the case of a transition from the locked state (position-fixed state) to the unlocked state (position-released state) will be described. The movable cam 2 is reversed in the releasing direction F2 by the rotation of the manipulation lever 53. In the cam mechanism, in the case where the cam lobe of the movable cam 2 and the cam lobe of the fixed cam 3 moves down slopes of the convex portions, the cam lobes thereof are meshed alternatively with each other in the circumferential direction to be fitted to each other, and thus the distance between the movable cam 2 and the fixed cam 3 is rapidly reduced. Accordingly, the clamping force Fd applied between the side plate portions 52*a* of the bracket 52 is relieved and there is a possibility that an impact may be transmitted to the rod 5. For example, the manipulation lever 53 is forcibly released and the operating force Fl of the manipulation lever 53 is rapidly lowered from the position P2 to the position P3 illustrated in FIG. 9.

In addition, the clamping force Fd applied between the side plate portions 52*a* of the bracket 52 is relieved and decreases as indicated by curve Q2 illustrated in FIG. 9. At this time, as illustrated in FIG. 5, when the outer ring 9 is rotated along the rotation of the movable cam 2 in the releasing direction F2, the wedge rollers 20 are rotated by friction between the outer ring 9 and the inner ring 7 (inner ring), and the rotation of the outer ring 9 of the roller clutch 8 is applied to fix the inner ring 7 by the wedge rollers 20. At this time, the slip ring 6 slips between the rod 5 and the inner ring 7 and generates appropriate frictional force. As a result, in the steering device 80, an impact caused by a force of the manipulation lever 53 is attenuated by friction against the inner ring 7, and thus the impact can be relieved. Therefore, as illustrated in FIG. 9, a change in the operating force Fl is maintained at the position P4. Accordingly, even when the clamping force Fd decreases, the operator can feel the difference Fm as the operating force Fl applied to the manipulation lever 53, and can realize the release of the clamping force Fd due to the attenuation of the operating force Fl as indicated by straight line Q3.

In addition, a decrease and increase in the elastic force of the slip ring 6 affects a decrease and increase in the difference Fm. In the steering device 80 according to the first embodiment, by appropriately setting the elastic force of the slip ring 6, a sensation of operating during the release of the clamping force Fd can be set.

As described above, in the unlocked state (position-released state), the clamping force Fd applied between the side plate portions 52*a* of the bracket 52 is relieved, and the frictional force between the side plate portions 52*a* of the bracket 52 and the outer column 54 is removed or reduced. Accordingly, the tilt position of the outer column 54 can be adjusted. In addition, when the manipulation lever 53 is rotated and the clamping force Fd applied between the side plate portions 52*a* of the bracket 52 is relieved, the width of a slit 54S of the outer column 54 illustrated in FIG. 4 is increased. Accordingly, the clamping force of the outer column 54 on the inner column 51 is removed, and thus the frictional force generated when the inner column 51 slides is removed. Accordingly, the operator can adjust the telescopic position by pressing the inner column 51 via the steering wheel 81 after rotating the manipulation lever 53.

As described above, the steering device 80 of the first embodiment includes the steering column 50, the bracket 52, and the fixing mechanism 1. The steering column 50 rotatably supports the input shaft 82*a* connected to the steering wheel 81. The bracket 52 pinches the steering column 50. The fixing mechanism 1 applies the clamping force Fd for the bracket 52 to pinch the steering column 50 according to the rotational position of the manipulation lever 53. The fixing mechanism 1 includes the roller clutch 8, the inner ring 7, the slip ring 6, and the rod 5 which penetrates through the side plate portions 52*a* of the bracket 52. The roller clutch 8 and the inner ring 7 are not operated in the clamping direction F1 in which the manipulation lever 53 is rotated to provide the clamping force Fd. However, the roller clutch 8 and the inner ring 7 are operated in the releasing direction F2 in which the manipulation lever 53 is rotated to release the clamping force Fd. The slip ring 6 is a friction providing member which applies frictional resistance to the rod 5 in a case where the roller clutch 8 and the inner ring 7 are operated.

In this structure, the roller clutch 8 and the inner ring 7 do not affect the operation of the manipulation lever 53 in the clamping direction F1 and can fix the position of the steering wheel 81. In addition, the roller clutch 8 and the inner ring 7 relieve an impact using the friction torque (frictional resistance) of the friction providing member after the manipulation lever 53 is rotated in the releasing direction F2 and the clamping force Fd of the bracket 52 on the steering column 50 is released. As a result, even in a case where the manipulation lever 53 is changed from the locked state (position-fixed state) to the unlocked state (position-released state), the releasing noise generated when the manipulation lever 53 is forcibly released can be reduced.

Second Embodiment

Figure 10:
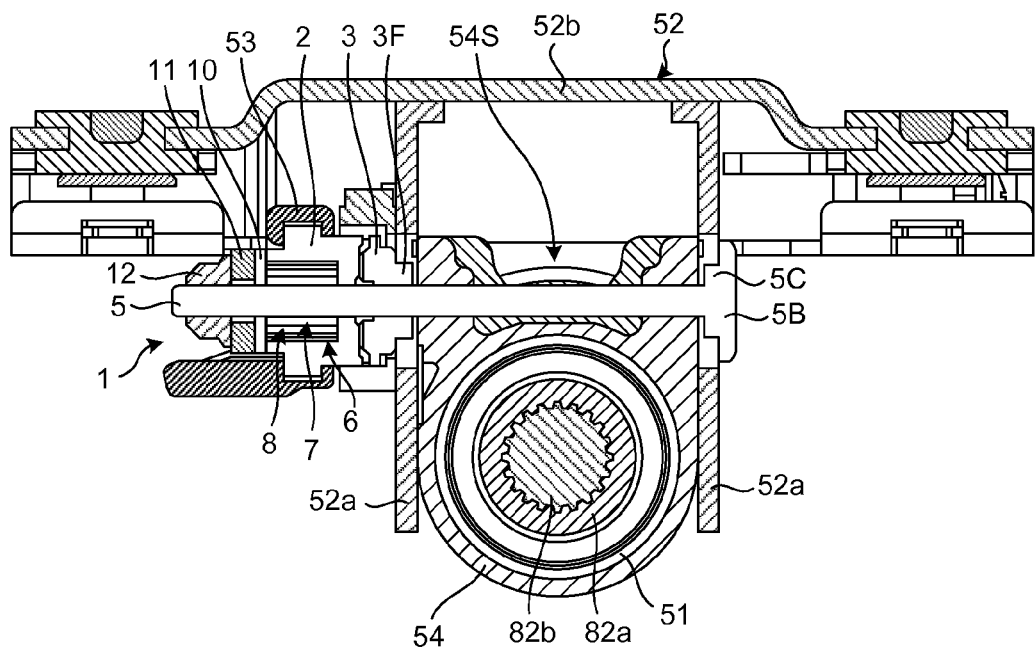
FIG. 10 is a sectional view schematically illustrating a fixing mechanism according to a second embodiment.

FIG. 10 is a sectional view schematically illustrating a fixing mechanism according to a second embodiment. Elements similar to those described above are denoted by the same reference numerals, and the superposing description thereof will be omitted. The fixing mechanism 1 according to the second embodiment does not include the spacer 4 according to the first embodiment, and includes the rod 5, the inner ring 7, the roller clutch 8, the slip ring 6, the movable cam 2, and the manipulation lever 53 in this order from the inner circumference thereof. Therefore, the slip ring 6 is fitted into the outer circumference of an outer ring 9 of the roller clutch 8. As described above, the roller clutch 8 has a cylindrical shape, and the slip ring 6 is positioned on the outer diameter side of the roller clutch 8. Since the wedge rollers 20 of the roller clutch 8 directly come into contact with the rod 5, it is preferable that the hardness of the rod 5 be increased.

As described above, in the roller clutch 8 according to the second embodiment, the outer ring 9 is linked to the rotation of the movable cam 2 via the slip ring 6. That is, the outer ring 9 is rotated along the rotation of the manipulation lever 53. In this structure, when the manipulation lever 53 is rotated in the clamping direction F1, the roller clutch 8 is not operated to transmit the rotation between the outer ring 9 and the inner ring 7 which is the inner ring. In addition, when the manipulation lever 53 is rotated in the releasing direction F2, the roller clutch 8 is operated to transmit the rotation between the outer ring 9 and the inner ring 7 which is the inner ring, and the impact can be relieved by friction torque between the roller clutch 8 and the slip ring 6. Accordingly, the steering device 80 according to the second embodiment can reduce the releasing noise.

In addition, without the inner ring 7 being mounted, the roller clutch 8 may be mounted on the rod 5 so that the wedge rollers 20 described above directly come into contact with the outer circumference of the rod 5. In this case, the hardness of the surface of the outer circumference of the rod 5 may be increased through a heat treatment. Even in the steering device 80 according to a modification example of the second embodiment, the releasing noise can be reduced.

Third Embodiment

Figure 11:
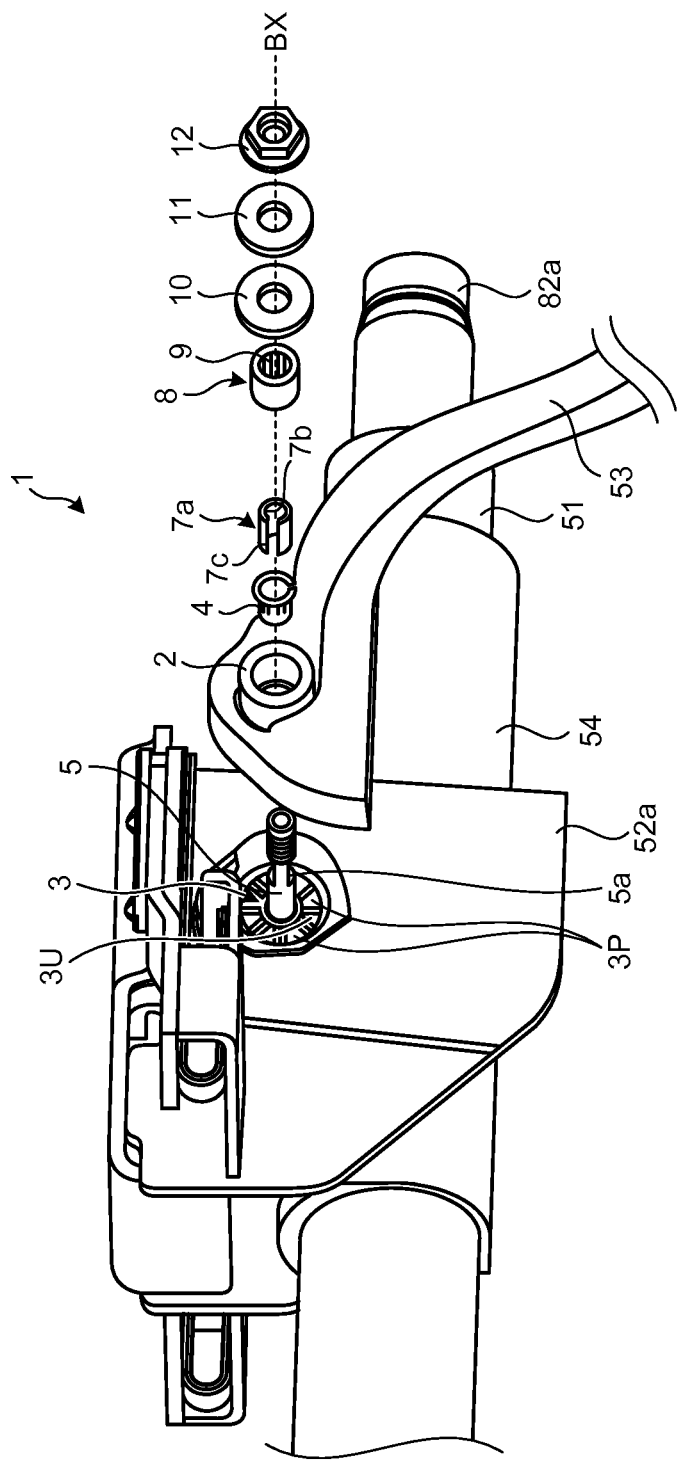
FIG. 11 is an exploded perspective view schematically illustrating a fixing mechanism according to a third embodiment.
Figure 12:
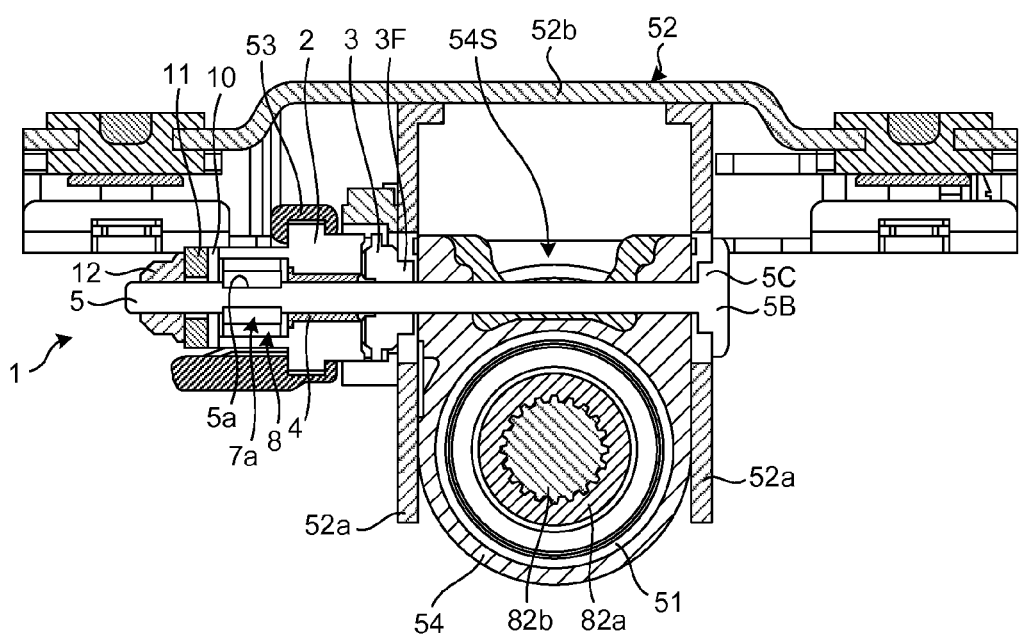
FIG. 12 is a sectional view schematically illustrating a fixing mechanism according to a third embodiment.

FIG. 11 is an exploded perspective view schematically illustrating a fixing mechanism according to a third embodiment. FIG. 12 is a sectional view schematically illustrating the fixing mechanism according to the third embodiment. The steering device 80 according to the third embodiment includes, instead of the inner ring 7 and the slip ring 6 according to the first embodiment, a resin inner ring 7a which has elasticity in the case where the surface thereof is pressed. The inner ring 7a is molded by using a material such as an oil-resistant resin including polyacetal, and a synthetic rubber having a high hardness including elastomer. As described above, the roller clutch 8 has a cylindrical shape, and the inner ring 7a which becomes a friction providing member is positioned on the inner diameter side of the roller clutch 8.

In the rod 5 according to the third embodiment, a portion of the outer circumference thereof is processed so that two flat surfaces 5a are provided on the upper and lower sides in one direction. An elongated hole 7b is formed in the inner ring 7a in the axial direction BX, and a portion of the inner ring 7a is cut as a slit 7c extending in the axial direction BX. By widening the slit 7c, the elongated hole 7b of the inner ring 7a is fitted to follow the flat surfaces 5a. In this structure, the inner ring 7a does not rotate relative to the rod 5.

When the outer ring 9 of the roller clutch 8 is rotated along the rotation of the movable cam 2 in the releasing direction F2, the rotation of the outer ring 9 of the roller clutch 8 allows the wedge rollers 20 provided in the outer ring 9 to be operated and fix the inner ring 7a. At this time, the inner ring 7a directly generates friction due to rotation relative to the wedge rollers 20 and thus can relieve an impact. As described above, the roller clutch 8 and the inner ring 7a according to the third embodiment are provided between the rod 5 and the movable cam 2, and in a case where the roller clutch 8 is operated to lock the inner ring 7a, can relieve an impact caused by the manipulation lever 53 which is forcibly released.

In the case where the outer ring 9 of the roller clutch 8 is rotated along the rotation of the movable cam 2 in the clamping direction F1, rollers are separated from the surface of the inner ring 7a, and the outer ring 9 of the roller clutch 8 and the inner ring 7a do not interfere with (operate) each other. Therefore, along with the rod 5, the inner ring 7a is rotated without resistance.

Fourth Embodiment

Figure 13:
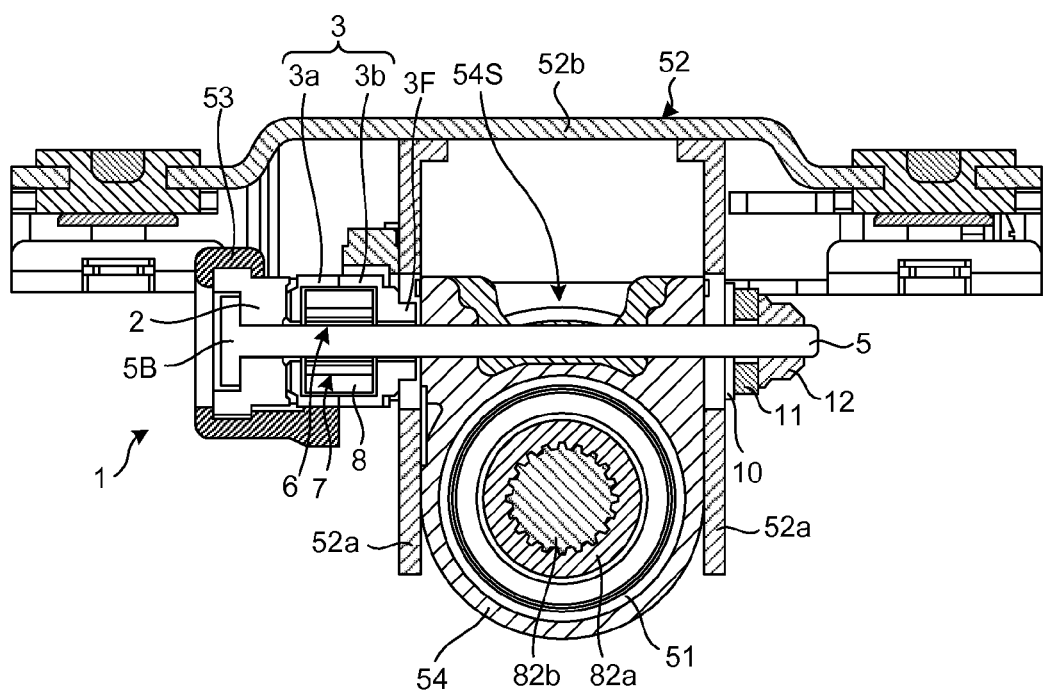
FIG. 13 is a schematic view schematically illustrating a fixing mechanism according to a fourth embodiment.

FIG. 13 is a schematic view schematically illustrating a fixing mechanism according to a fourth embodiment. In the steering device 80 according to the fourth embodiment, the inner ring 7, the slip ring 6, and the roller clutch 8 according to the first embodiment are assembled to the inside of the fixed cam 3. Therefore, the fixed cam 3 is divided into a first fixed cam 3a and a second fixed cam 3b in the axial direction BX. In the fixing mechanism 1 of the fourth embodiment, the slip ring 6, the inner ring 7, and the roller clutch 8 are inserted in this order from the inside of the rod 5 in the second fixed cam 3b. Next, the first fixed cam 3a is assembled to cover the slip ring 6, the inner ring 7, and the roller clutch 8. In addition, the first fixed cam 3a and the second fixed cam 3b are fixed to be integrated with each other. The outer ring 9 of the roller clutch 8 is press-fitted and fixed to the fixed cam 3 (the first fixed cam 3a and the second fixed cam 3b). As described above, the roller clutch 8 has a cylindrical shape, and the slip ring 6 is positioned on the inner diameter side of the roller clutch 8.

The rod 5 according to the fourth embodiment is mounted in a direction reverse to that of the first embodiment. The rod 5 penetrates through the manipulation lever 53, the movable cam 2, the roller clutch 8, the inner ring 7, the slip ring 6, and the fixed cam 3 on the rod head portion 5B side, and penetrates through the thrust bearing 11 and the washer 10 on the nut 12 side. The rod 5 is fixed to the movable cam 2 through press-fitting or the like and is linked to the rotation of the manipulation lever 53. On the other hand, the position of the fixed cam 3 is determined by the rotation stopper portion 3F, and the rotation stopper portion 3F enables the fixed cam 3 to slide in a tilt direction with respect to the side plate portion 52a of the bracket 52 and makes the fixed cam 3 relatively non-rotatable such that the fixed cam 3 is not linked to the rotation of the manipulation lever 53 and the rod 5.

The inner ring 7 which acts as the inner ring is linked to the rotation of the movable cam 2 via the slip ring 6. That is, the inner ring 7 is rotated along the rotation of the manipulation lever 53. In this structure, in the case where the manipulation lever 53 is rotated in the clamping direction F1, the roller clutch 8 is not operated to transmit the rotation between the outer ring 9 and the inner ring 7 which is the inner ring. In addition, when the manipulation lever 53 is rotated in the releasing direction F2, the roller clutch 8 is operated to transmit the rotation between the outer ring 9 and the inner ring 7 which is the inner ring, and the impact can be relieved by friction torque between the roller clutch 8 and the slip ring 6.

When the inner ring 7 is rotated along the rotation of the movable cam 2 in the releasing direction F2 via the rod 5, the rotation of the inner ring 7 allows the inner wedge rollers 20 to be operated and fixes the outer ring 9. At this time, the slip ring 6 simultaneously slips between the rod 5 and the inner ring 7 and generates appropriate frictional force. As a result, in the steering device 80, an impact caused by a force of the manipulation lever 53 is attenuated by the rotation of the rod 5 and friction generated between the rod 5 and the inner ring 7, and thus the impact can be relieved. As described above, the roller clutch 8 and the inner ring 7 according to the fourth embodiment are provided between the rod 5 and the fixed cam 3, and in a case where the roller clutch 8 is operated and the roller clutch 8 is locked, can relieve an impact caused by the manipulation lever 53 which is forcibly released. Accordingly, the steering device 80 according to the fourth embodiment can reduce the releasing noise.

When the inner ring 7 is rotated along the rotation of the movable cam 2 in the clamping direction F1, rollers are separated from the surface of the inner ring 7, and the outer ring 9 of the roller clutch 8 and the inner ring 7 do not interfere with (operate) each other. Therefore, along with the rod 5, the inner ring 7 is rotated without resistance.

REFERENCE SIGNS LIST

1 FIXING MECHANISM
2 MOVABLE CAM
3 FIXED CAM
3a FIRST FIXED CAM
3b SECOND FIXED CAM
3F ROTATION STOPPER PORTION
4 SPACER
5 ROD
5B ROD HEAD PORTION
5C ROTATION STOPPER PORTION
6 SLIP RING
7, 7a INNER RING
8 ROLLER CLUTCH
9 OUTER RING
10 WASHER
11 THRUST BEARING
12 NUT
13 VEHICLE SIDE MEMBER
20 WEDGE ROLLER
50 STEERING COLUMN
51 INNER COLUMN
52 BRACKET
52a SIDE PLATE PORTION
52b MOUNTING PLATE PORTION
53 MANIPULATION LEVER
54 OUTER COLUMN
58 DETACHMENT CAPSULE
59 CAPSULE SUPPORT PORTION
70 ELECTRIC MOTOR
80 STEERING DEVICE
81 STEERING WHEEL
82 STEERING SHAFT
82a INPUT SHAFT
82b OUTPUT SHAFT
83 STEERING FORCE ASSISTANCE MECHANISM
84 UNIVERSAL JOINT
85 LOWER SHAFT
86 UNIVERSAL JOINT
87 PINION SHAFT
88 STEERING GEAR
88a PINION
88b RACK
89 TIE ROD
91a TORQUE SENSOR
91b VEHICLE SPEED SENSOR
92 REDUCTION GEAR
98 IGNITION SWITCH
F1 CLAMPING DIRECTION
F2 RELEASING DIRECTION
PV TILT PIVOT

The invention claimed is:

1. A steering device comprising:
a steering column rotatably supporting an input shaft connected to a steering wheel;
a bracket pinching the steering column; and
a fixing mechanism configured to select an unlocked state in which the bracket is releasing the steering column and a locked state in which the fixing mechanism is configured to provide a clamping force for allowing the bracket to pinch the steering column, according to a rotational position of an manipulation lever,
wherein the fixing mechanism includes
a rod penetrating through the bracket,
a roller clutch including an outer ring and an inner ring positioned on an inner diameter side of the outer ring, the roller clutch configured not to be operated in a clamping direction in which the manipulation lever is rotated to provide the clamping force, and to be operated in a releasing direction in which the manipulation lever is rotated to release the clamping force,
a friction providing member to provide a frictional resistance to the rod in a case where the roller clutch is operated, and
a cam mechanism which provides the clamping force according to a rotation of the manipulation lever,
wherein the cam mechanism includes a movable cam which is able to rotate according to the rotational position of the manipulation lever, and a fixed cam which is mounted to a side plate portion of the bracket and is unable to rotate relative to the rotation of the manipulation lever,
the movable cam and the fixed cam are supported on the rod so that a distance between surfaces of the movable cam and the fixed cam is movable in an axial direction of the rod, a rotation of the movable cam is linked to the rotation of the manipulation lever, the roller clutch and the friction providing member are arranged in the movable cam or the fixed cam,
the roller clutch and the friction providing member do not affect an operation of the manipulation lever, and the bracket is configured to clamp the steering column according to a change of the distance between the surfaces of the movable cam and the fixed cam according to the rotation of the manipulation lever, in a case where the fixing mechanism is operated from the unlock state to the locked state corresponding to the rotation of the manipulation lever in a clamping direction, and
the friction providing member is configured to provide a frictional resistance to the rod by transmission of rotation between the outer ring and the inner ring of the roller clutch rotating linked to the movable cam, in a case where the fixing mechanism is operated from the lock state to the unlocked state corresponding to the rotation of the manipulation lever in a releasing direction.

2. The steering device according to claim 1, wherein the roller clutch is cylindrical and has the friction providing member on an inner diameter side thereof.

3. The steering device according to claim 1, wherein the roller clutch is cylindrical and has the friction providing member on an outer diameter side thereof.

4. The steering device according to claim 1, wherein the roller clutch includes an outer ring, an inner ring which is positioned on an inner diameter side of the outer ring, and a wedge roller which is operated as a wedge between the outer ring and the inner ring in the releasing direction and allows the wedge between the outer ring and the inner ring to separate in the clamping direction.

5. The steering device according to claim 4,
wherein the outer ring is configured to link to the rotation of the manipulation lever, and
the rod penetrates through the inner ring, the rod is arranged to be unable to rotate relative to the rotation of the manipulation lever.

6. The steering device according to claim 3,
wherein the outer ring is press-fitted and fixed to the fixed cam, and
the rod penetrates through the inner ring and is configured to link to the rotation of the manipulation lever.

7. The steering device according to claim 1,
wherein the friction providing member is a slip ring which generates friction against an outside surface of a plate spring or an inside surface of the plate spring through an elastic force by bending the plate spring.

8. The steering device according to claim 1,
wherein the friction providing member is a resin inner ring which has elasticity in a case where a surface thereof is pressed, and is fixed to an outer circumference of the rod.

* * * * *